US009657886B2

(12) United States Patent
Hoshi et al.

(10) Patent No.: US 9,657,886 B2
(45) Date of Patent: May 23, 2017

(54) ROTATION RANGE-LIMITING DEVICE-EQUIPPED APPARATUS

(71) Applicant: MINEBEA CO., LTD., Kitasaku-gun, Nagano (JP)

(72) Inventors: Hiroya Hoshi, Fukuroi (JP); Shinichi Fujisawa, Akiruno (JP)

(73) Assignee: MINEBEA CO., LTD., Nagano (JP)

( * ) Notice: Subject to any disclaimer, the term of this patent is extended or adjusted under 35 U.S.C. 154(b) by 0 days.

(21) Appl. No.: 14/683,648

(22) Filed: Apr. 10, 2015

(65) Prior Publication Data
US 2015/0316200 A1  Nov. 5, 2015

(30) Foreign Application Priority Data

Apr. 30, 2014 (JP) .................... 2014-094078

(51) Int. Cl.
| | |
|---|---|
| *E04G 3/00* | (2006.01) |
| *F16M 11/06* | (2006.01) |
| *F16M 13/02* | (2006.01) |
| *G05G 5/04* | (2006.01) |
| *F16M 11/16* | (2006.01) |
| *F21V 21/30* | (2006.01) |
| *F21V 21/15* | (2006.01) |
| *G03B 17/56* | (2006.01) |

(52) U.S. Cl.
CPC .......... *F16M 11/06* (2013.01); *F16M 11/16* (2013.01); *F16M 13/022* (2013.01); *F21V 21/15* (2013.01); *F21V 21/30* (2013.01); *G03B 17/561* (2013.01); *G05G 5/04* (2013.01); *F16M 2200/021* (2013.01)

(58) Field of Classification Search
CPC .......... F16M 11/041; F16M 11/06; F16M 2200/021; F16M 11/16
See application file for complete search history.

(56) References Cited

U.S. PATENT DOCUMENTS

| | | | | |
|---|---|---|---|---|
| 5,040,759 A | * | 8/1991 | Wainwright | ........... F16M 11/08 248/186.2 |
| 2007/0019418 A1 | | 1/2007 | Czech et al. | |
| 2007/0132655 A1 | * | 6/2007 | Lin | ........ H01Q 1/125 343/880 |

FOREIGN PATENT DOCUMENTS

| | | |
|---|---|---|
| JP | H04-150384 A | 5/1992 |
| JP | H07-190162 A | 7/1995 |

OTHER PUBLICATIONS

Feb. 28, 2017 Office Action issued in Japanese Patent Application No. 2014-094078.

* cited by examiner

*Primary Examiner* — Amy Sterling
(74) *Attorney, Agent, or Firm* — Oliff PLC (57) ABSTRACT

A rotation range-limiting device 10 is provided with a rotation body 20 provided with a first surface and a carrying surface, and a stationary body 30 supporting the rotation body such that the rotation body is rotatable about a center point thereof. The stationary body has a second surface opposed to the first surface. One 212 of the first surface and the second surface is provided with an arc-shaped slide-guiding portion 24 whose center corresponds to the center point of the rotation body, and a slider 26 movable along the slide-guiding portion. The other 301 of the first surface and the second surface is provided with a locking portion 36, which projects toward the slide-guiding portion at a location on a circle having the same diameter as the slide-guiding portion such that it can abut against the slider.

7 Claims, 10 Drawing Sheets

PRIOR ART

Fig. 8B

PRIOR ART

Fig. 8C

PRIOR ART

ROTATION RANGE-LIMITING DEVICE-EQUIPPED APPARATUS

CROSS-REFERENCE TO RELATED APPLICATIONS

This application claims priority from Japanese Patent Application No. 2014-094078 filed on Apr. 30, 2014, which is incorporated herein by reference.

BACKGROUND OF THE INVENTION

1. Field of the Invention

The present invention relates to a device for mechanically limiting a rotation range of a rotation body being capable of carrying a device such as a camera and a lighting equipment thereon within a predetermined range of from 360 degrees to 720 degrees.

2. Background of the Invention

Figure 8A:
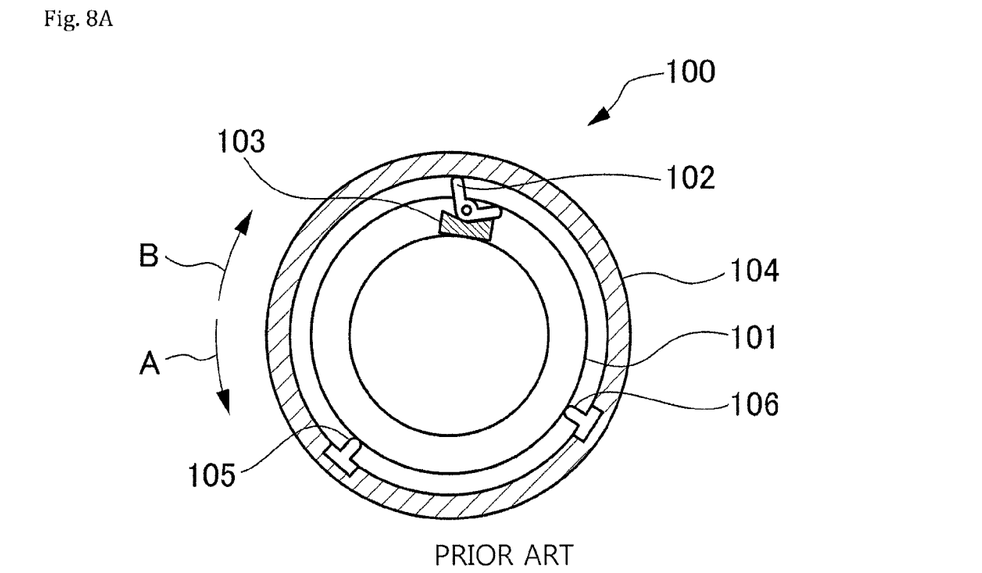
FIG. 8A is a front view of a conventional rotation range-limiting device which is in the midst of rotating.
Figure 8B:
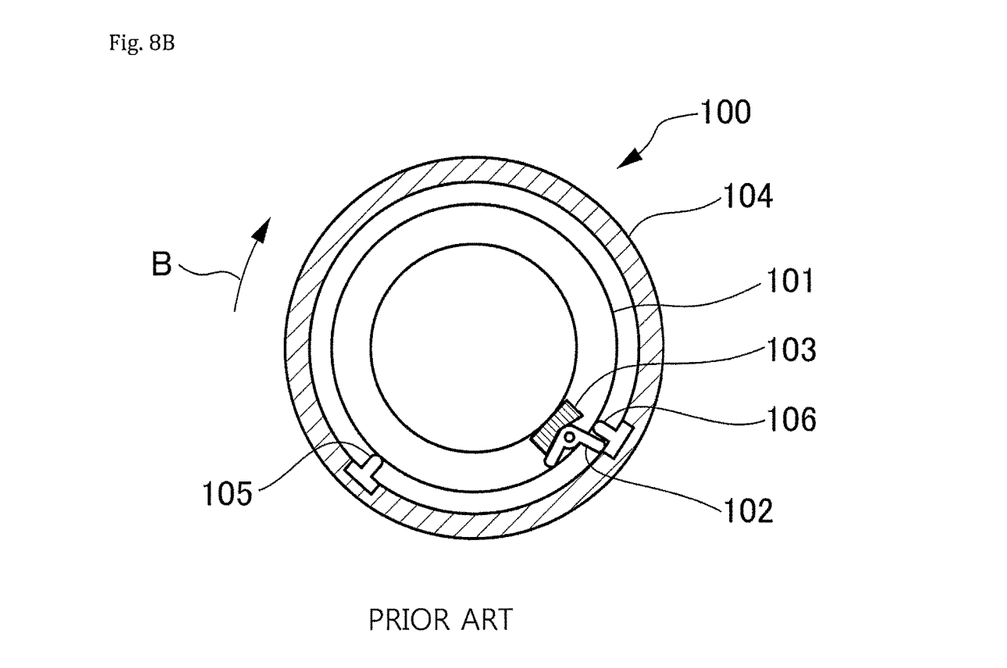
FIG. 8B is a front view of the conventional rotation range-limiting device in which its rotation in one direction is inhibited.
Figure 8C:
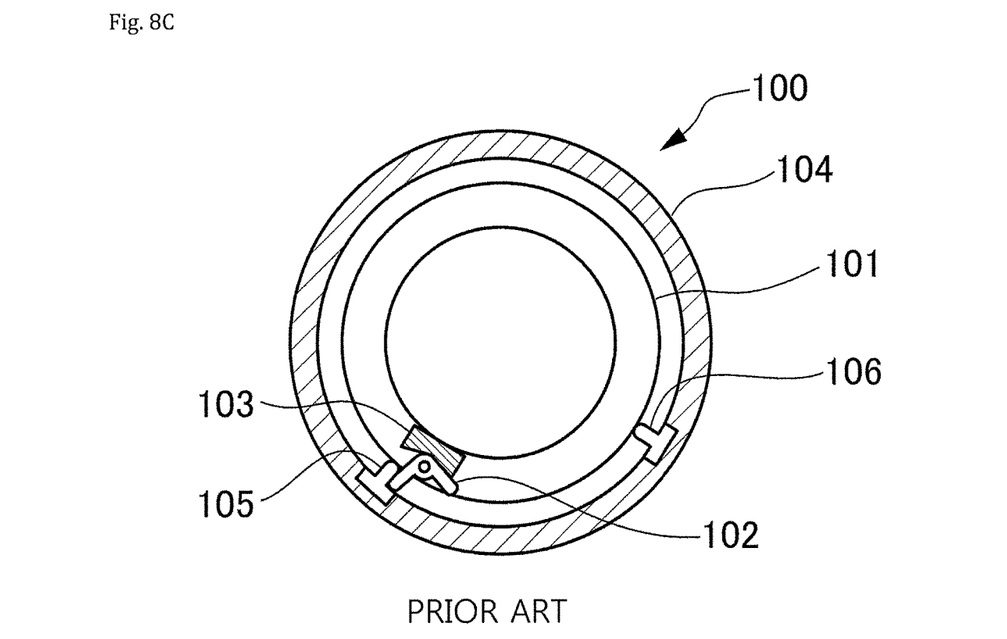
FIG. 8C is a front view of the conventional rotation range-limiting device in which its rotation in another (opposite) direction is inhibited.

Conventionally, there has been proposed a turning mechanism or device configured to mechanically limit a rotation range of a rotation body within a predetermined range. For example, see Japanese unexamined Patent Publication JP H7-190162 A (in particular, FIG. 3). As shown in FIGS. 8A-8C, the turning mechanism or device (i.e., a rotation range-limiting device) 100 as disclosed in JP H7-190162 A has a L-shaped block 102 rotatable about a rotation body (i.e., turning shaft) 101, and a block 103 configured to limit a rotation range of the L-shaped block 102. The L-shaped block 102 has a step (a difference in level) on its one side. The turning mechanism or device 100 has a stationary body (i.e. a stationary portion) 104, which rotatably supports the rotation body 101 and is provided with a low stationary block 105 and a high stationary block 106.

Referring to FIG. 8A, the rotation body 101 is rotated in "A" direction. In an extension of the L-shaped block 102 extending toward the stationary body there is provided with a step (a difference in level) which prevents collision against the low block 105. Due to such a step the L-shaped block 102 can pass over the low stationary block 105 and collide against the high stationary block 106. See FIG. 8B. At this time, the block 103 prevents the L-shaped block 102 from turning or rotating in a clockwise direction. As a result, the rotation of the rotation body 101 is blocked or stopped.

Next, when the rotation body 101 is rotated from the position as shown in FIG. 8B in "B" direction, the L-shaped block 102 passes over the low stationary block 105 and collides against the high stationary block 106. Then, the L-shaped block 102 changes its (rotation) direction while rotating. In other words, the L-shaped block 102 then rotates in a counterclockwise direction. Since another extension (i.e., an extension other than the extension extending toward the stationary body) of the L-shaped block 102 has no step (i.e., a difference in level), it collides against the low stationary block 105, thereby inhibiting the rotation of the rotation body 101. This can make mechanically limit the rotatable angle of the rotation body 101 to a predetermined range of from 360 degrees to 720 degrees.

However, as the conventional rotation range-limiting device as disclosed in JP 117-190162 A is provided with the stationary block disposed outside the rotation body, an overall apparatus has a tendency to get bigger. Furthermore, the L-shaped block, the block, and the stationary block are needed, thereby increasing the number of parts to be needed.

SUMMARY OF THE INVENTION

The present invention is provided for solving the aforementioned problems. In other words, the objective of the invention is to provide a rotation range-limiting device which can downsize an overall apparatus while decreasing the number of parts to be needed.

In accordance with one aspect of the invention, there is provided a rotation range-limiting device, which has:

a rotation body provided with a first surface, and a carrying surface being capable of carrying an object to be rotated thereon, and a stationary body opposed to the rotation body, and supporting the rotation body such that the rotation body is rotatable about a center point of the rotation body. The stationary body has a second surface opposed to the first surface of the rotation body. One of the first surface and the second surface is provided with (a) an arc-shaped slide-guiding portion, center of which corresponds to the center point of the rotation body, (b) end walls formed at both ends of the slide-guiding portion, and (c) a slider movable along the slide-guiding portion. The other of the first surface and the second surface is provided with a locking portion, which projects toward the slide-guiding portion at a location on a circle having the same diameter as the slide-guiding portion such that it can abut against the slider.

In accordance with another aspect of the invention, there is provided a rotation range-limiting device, which has:

a rotation body to which an object to be rotated is mounted, a stationary body rotatably supporting the rotation body, an arc-shaped slide-guiding portion disposed on either one of the rotation body and the stationary body, and having end walls formed at both ends thereof, a locking portion disposed on another of the rotation body and the stationary body, and a slider movable along the slide-guiding portion. When the slider abuts against the locking portion and either one of the end walls of the slide-guiding portion, the slider is stopped from rotation.

DETAILED DESCRIPTION OF THE INVENTION

First Embodiment

The first embodiment of an inventive rotation range-limiting device and a camera apparatus will hereinafter be described in detail with reference to the drawings. Firstly referring to FIG. 1 the first embodiment of the inventive rotation range-limiting device 10 has a disc-shaped rotation body 20 provided with a carrying surface 211 on which a camera (i.e., a device or an object to be rotated) 11 can be carried, and a stationary body 30 opposed to the rotation body 20 and rotatably supporting the rotation body 20 about a center (i.e., center point) of the rotation body 20. For reference, an example in which the camera 11 such as a security camera is mounted to a lower surface of the rotation body 20 as the carrying surface 211 will hereinafter be provided. For convenience, the stationary body 30 side is considered an upper side and the rotation body 20 side is considered a lower side. But one skilled art can appreciate that this positional concept is only introduced for illustration, and is not absolute.

Figure 1:
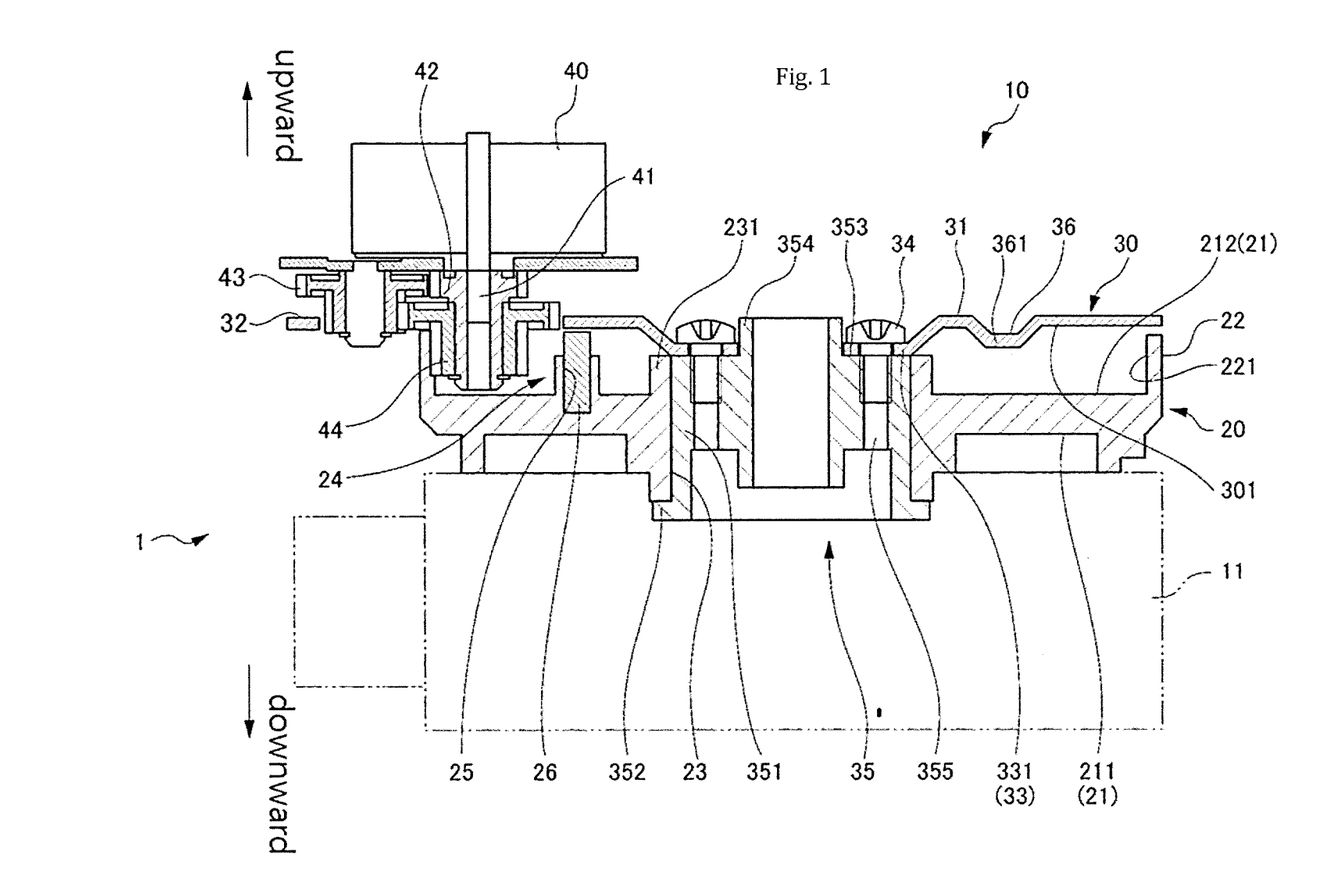
FIG. 1 is a sectional view of a camera apparatus in which a camera (device) is mounted to a first embodiment of the inventive rotation range-limiting device.
Figure 2:
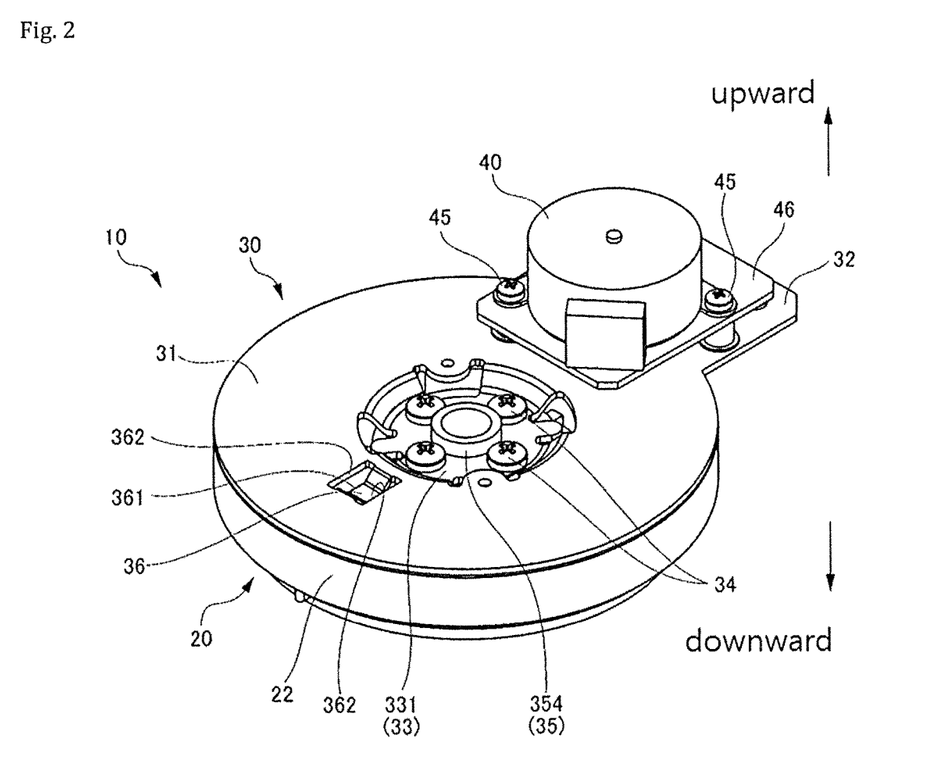
FIG. 2 is a perspective view of a first embodiment of the inventive rotation range-limiting device, viewed from above.
Figure 3:
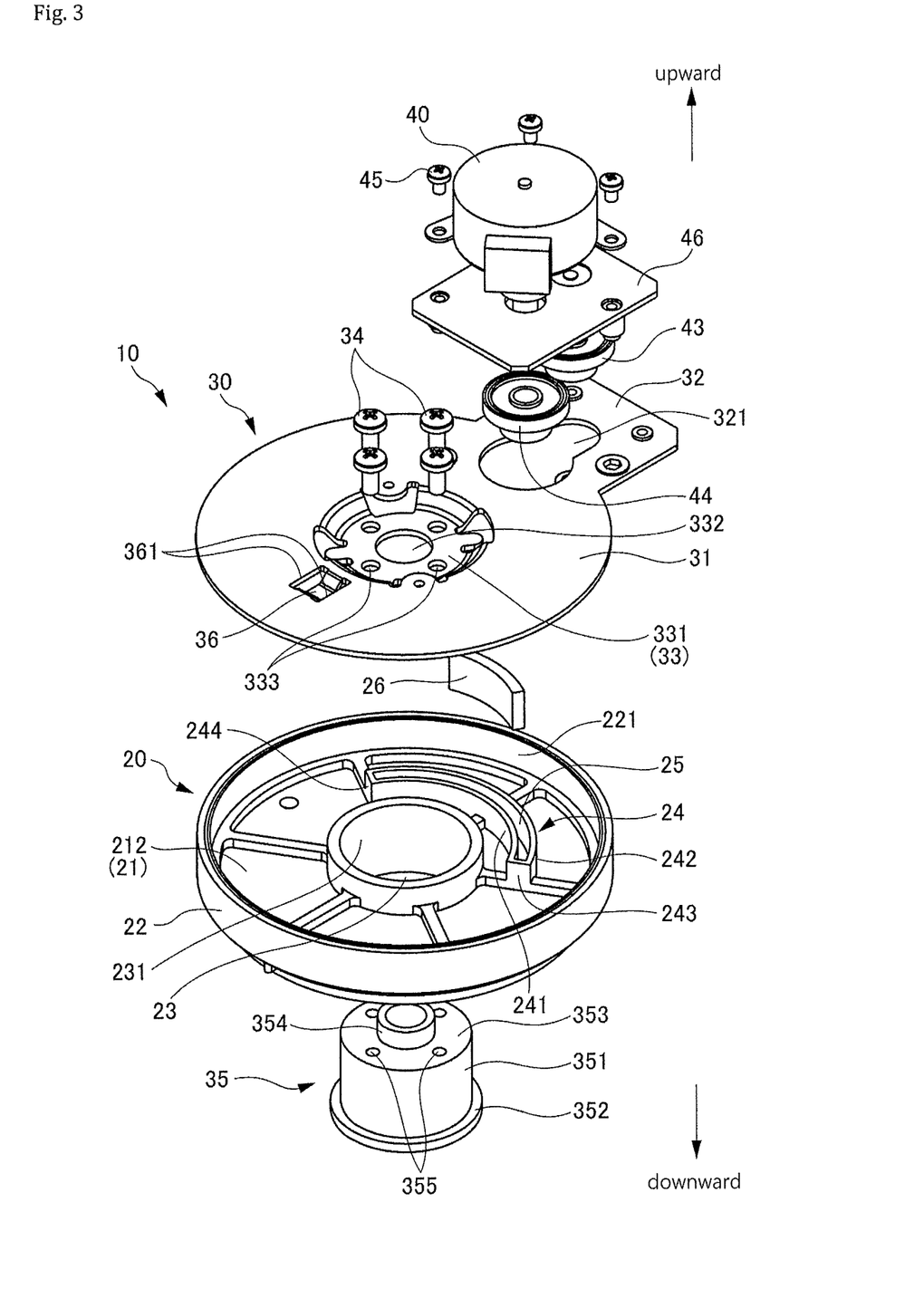
FIG. 3 is an exploded perspective view of the inventive rotation range-limiting device, viewed from above.

Referring to FIGS. 1-3, the stationary body 30 is an approximately planar material, and has a circular main body 31 and an approximately rectangular extension 32 externally extending from the main body 31. The circular main body 31 and the extension 32 are in the same plane. The stationary body 30 can be indirectly coupled via a mount (not shown) to a predetermined surface such as a ceiling plane on which a camera apparatus 1 is to be disposed or mounted. Alternatively, the stationary body 30 can be directly mounted to the predetermined surface on which the camera apparatus 1 is to be disposed, for example, by folding the outer periphery of the stationary body 30 in the shape of a tube at a side opposite to the rotation body 20. In the middle or center of the circular main body 31 there is a truncated cone-shaped depression 33 projecting toward the rotation body 20 side. In the middle or center of a bottom surface 331 of the depression 33 there is provided a circular through-hole 332. In the periphery of the through-hole 332 there is provided a plurality of mounting holes 333. Each of the mounting holes 333 is provided for passing a mounting screw 34 therethrough.

A locking portion 36 projecting toward the rotation body 20 side is provided in a predetermined location other than the depression 33, of a lower surface 301 (i.e., another of opposed surfaces) of the stationary body 30 opposed to the rotation body 20. The predetermined location will be mentioned below. The both circumferential end surfaces 361 of the locking portion 36 are formed in a linear manner in a radial direction of the stationary body 30. In this regard, see FIG. 4B. Furthermore, in a case where the stationary body 30 is formed by press forming of metallic plate, the locking portion 36 can be formed by making a pair of parallel cuts (pre-cuts) 362 along the radial direction of the stationary body 30 in the main body 31 of the stationary body 30 (see FIG. 2), and then carrying out downward extrusion or ejection. Furthermore, in a case where the stationary body 30 is formed of resin, the locking portion 36 can be integrally formed with the main body 31 of the stationary body 30. Alternatively, the locking portion 36 can be independently formed by attaching a separate member to the lower surface 301 of the stationary body 30 by using an adhesive or screw.

A rotation shaft bearing 35 is upward coupled or attached to the depression 33 from underneath. The rotation shaft bearing 35 has an approximately cylindrical main body 351. The lower end of the main body 351 is provided with a ring-shaped receiving portion 352 which externally extends from the outer periphery of the main body 351. The center of an upper surface 353 of the main body 351 is provided with a projection (i.e., convex portion) 354 which projects upward. A plurality of screw holes 355 threadably engageable with the mounting screw 34 is formed in the circumference of the projection 354. The outer diameter of the projection 354 corresponds to the inner diameter of the through-hole 332 of the depression 33. The projection 354 can be inserted into the through-hole 332. Furthermore, each of the screw holes 355 corresponds to each of the mount hole 333 of the depression 33 in it arrangement or position.

Therefore, when the rotation shaft bearing 35 is coupled to the rotation body 30, the projection 354 of the rotation shaft bearing 35 is inserted into the through-hole 332 of the depression 33 of the stationary body 30. Next, the screw hole 355 of the rotation shaft bearing 35 is in line with the mount hole 333 of the depression 33. The mounting screw 34 is then inserted into the mount hole 333 of the depression 33, and is further coupled to the screw hole 355 of the rotation shaft bearing 35.

As shown in FIGS. 1 and 3, the rotation body 20 has a circular rotation plate 21, and a peripheral wall 22 extending from a peripheral edge (end) of the rotation plate 21 toward the stationary body 30 side (i.e., upward). The peripheral wall 22 is low (in height), and the rotation body 20 is overall approximately disc-shaped. The inner surface of the peripheral wall 22 is provided with a panning gear 221 for rotating the rotation body 20 in a horizontal plane (i.e., panning). There is provided a center hole 23, through which the rotation shaft bearing 35 is passed, in the center of the rotation plate 21. The inner periphery of the center hole 23 is provided with a center wall 231. The lower end surface of the center wall 231 is supported from underneath by the bearing 352 of the rotation shaft bearing 35. In addition, the center of the center hole 23 corresponds to the center of the rotation plate 21, and the center point of the rotation body means the center hole 23.

The surface (i.e., the lower surface) of the rotation plate 21 away from the stationary body 30 corresponds to the carrying surface 211 on which the camera 11 is mounted. The surface 212 (one of the opposed surfaces) opposite to the carrying surface 211 and opposed to the stationary body 30 corresponds to the upper surface. The surface 212 is provided with a slide rail 24, which is an example of the slide-guiding portion. The slide rail 24 is disposed in the vicinity of the center wall 231. The slide rail 24 and the center wall 231 are formed in a concentric fashion. The slide rail 24 is arc-shaped. The slide rail 24 has an inner wall 241 and an outer wall 242 formed at a regular interval to each other. An arc-shaped groove 25 is formed between the inner wall 241 and the outer wall 242. The both circumferential ends of the groove 25 are provided with end walls 243 and 244, respectively.

Figure 5A:
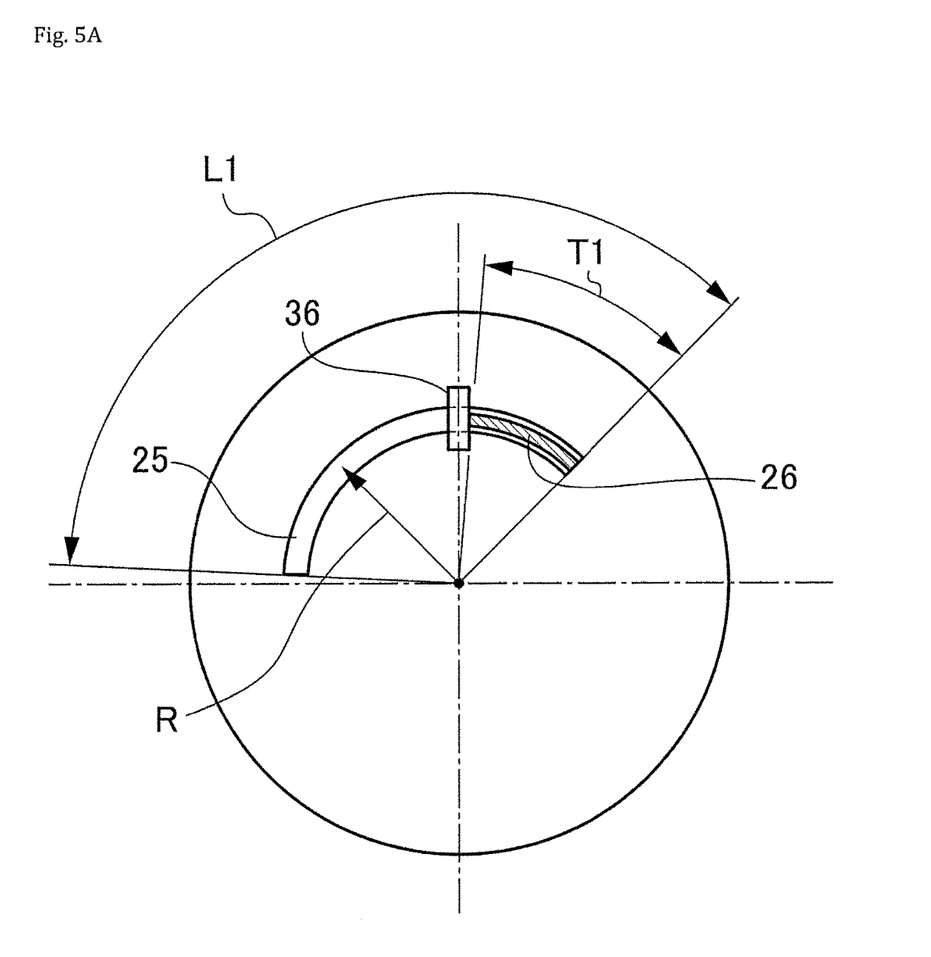
FIG. 5A illustrates the rotation body, rotation of which is inhibited.
Figure 5B:
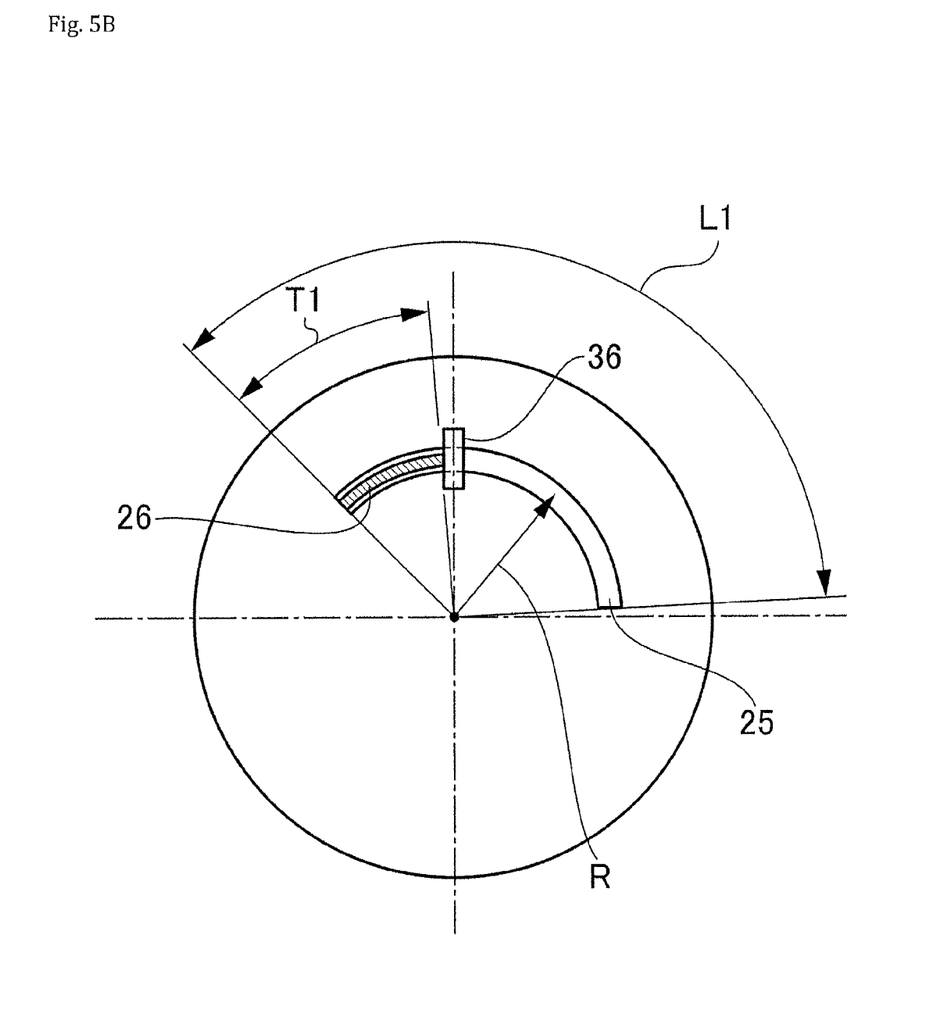
FIG. 5B illustrates the rotation body, rotation of which is inhibited.

An arc-shaped slider 26 is moveably formed along the groove 25. The radius of the slider 26 is approximately equal to the radius of the groove 25. The thickness of the slider 26 is less than the width of the groove 25. The peripheral length T1 of the slider 26 is less or shorter than the peripheral length L1 of the groove 25. See FIG. 5. Referring to FIG. 1, when the rotation body 20 is rotatably coupled to the stationary body 30, the slider 26 which is moveably inserted into the groove 25 of the slide rail 24 is disposed such that the upper end portion of the slider 26 is upwardly exposed beyond the slide rail 24. The slider 26 does not reach the lower surface 301 of the stationary body 30. However, the slider 26 is high enough that the upper end of the slider 26 abuts against the locking portion 36 which is formed in the stationary body 30.

As shown in FIGS. 1-3, the extension 32 of the stationary body 30 is provided with a motor 40 configured to rotate the rotation body 20. The height of the motor 40 can be adjusted via the mount 46 by the screw 45. The extension 32 is provided with a notch 321 for a motor. The motor 40 is coupled to the notch 321 such that a rotation shaft 41 is aimed downward. The rotation shaft 41 is coupled to a driving gear 42. An intermediate gear 43 intermeshing the driving gear 42 is rotatably disposed. A pinion gear 44 intermeshes the intermediate gear 43 as well as the panning gear 221 formed in the peripheral wall 22 of the rotation body 20.

Accordingly, when the motor 40 rotates, the driving gear 42 rotates the intermediate gear 43, and the intermediate gear 43 then rotates the pinion gear 44. Furthermore, as the pinion gear 44 rotates the panning gear 221 of the rotation body 20, the rotation body 20 rotates in panning direction.

Figure 4A:
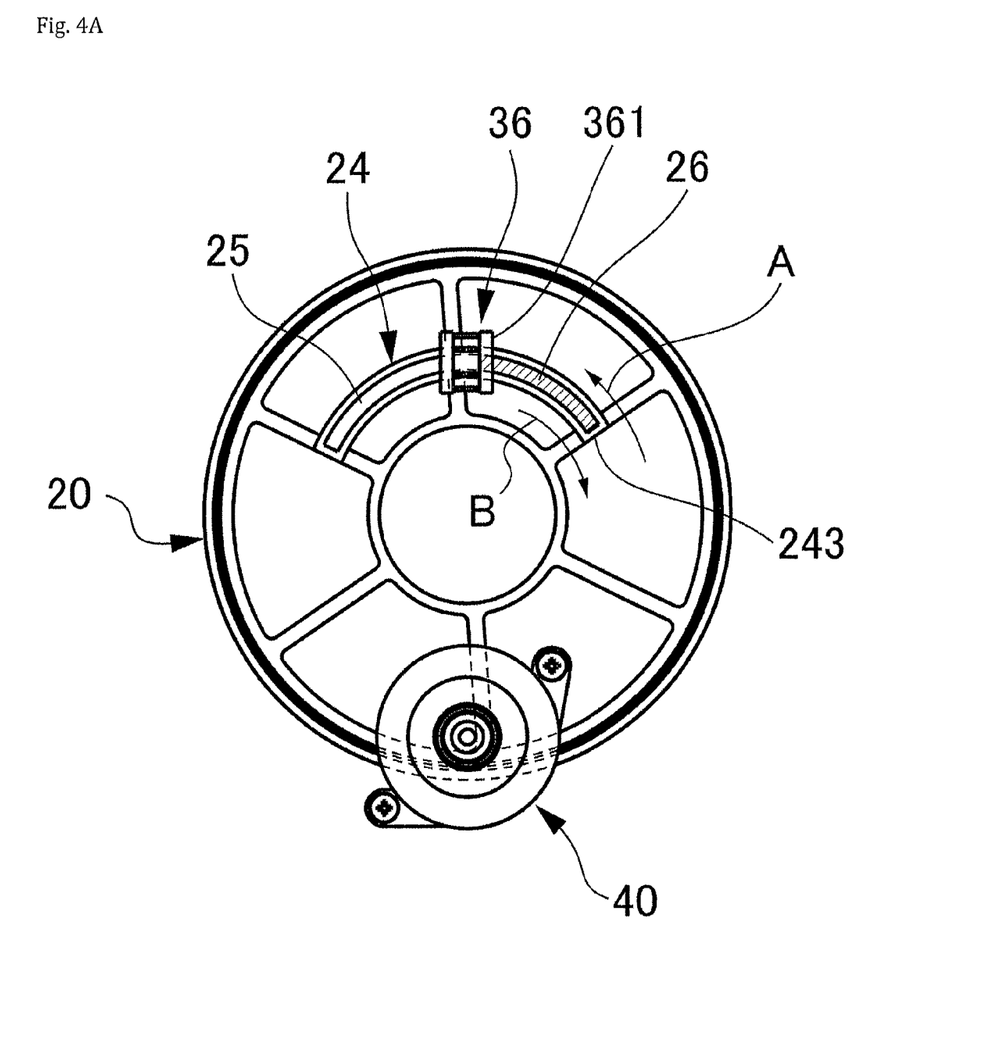
FIG. 4A is a plan view showing a state in which rotation of a rotation body in one direction is inhibited.
Figure 4B:
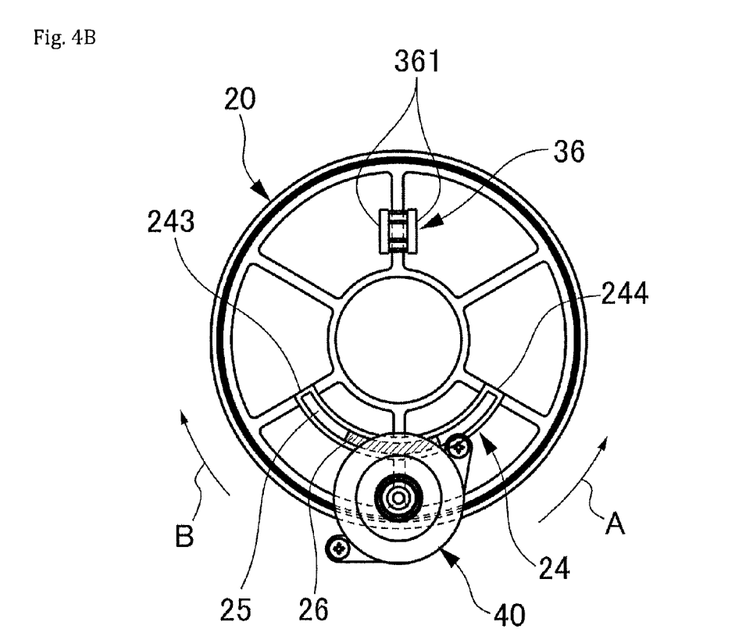
FIG. 4B is a plan view showing a state in which the rotation body is in the midst of rotation.

Next, the rotation range limitation of the rotation body 20 will be described. Referring to FIG. 4B, the rotation body 20 can be rotated in either of A direction or B direction relative to the stationary body 30. In this state, the slider 26 does not abut against any of the end walls 243 and 244 of the slide rail 24. In addition, the slider 26 does not abut against the locking portion 36 of the stationary body 30.

When the rotation body 20 in a state as shown in FIG. 4B is rotated in A direction, the slider 26 moves together with the slide rail 24, and one end surface of the slider 26 abuts against the end surface 361 of the locking portion 36. See FIG. 4A. As a result, the slider 26 is stopped. At the same time, the slider 26 is relatively moved in B direction within the slide rail 24. When another end surface of the slider 26 abuts against the end wall 243 of the slide rail 24, the rotation of the rotation body 20 is inhibited. In other words, the rotation body 20 is held with the locking portion 36 via the slider 26.

Figure 4C:
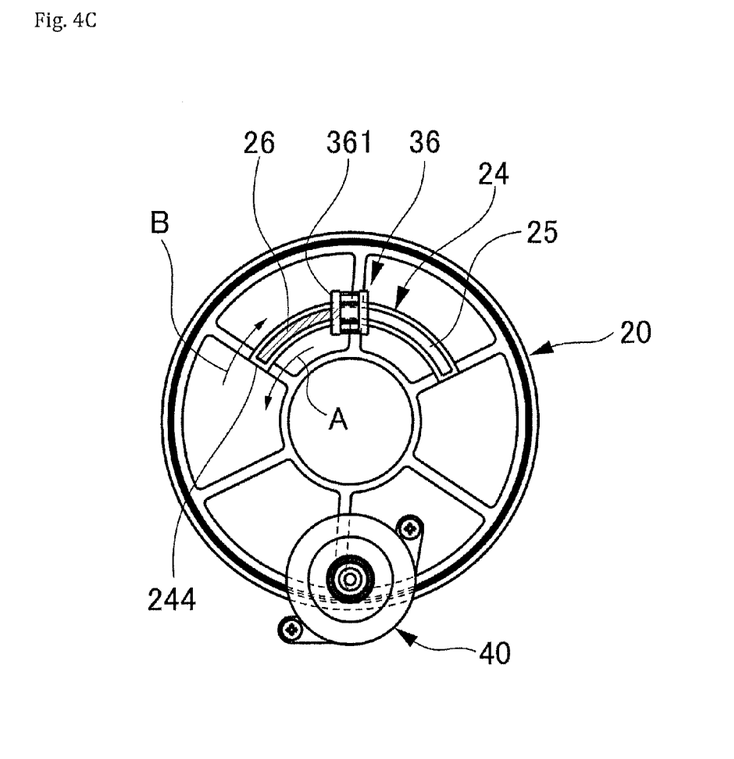
FIG. 4C is a plan view showing a state in which rotation of the rotation body in another (i.e., opposite) direction is inhibited.

When the rotation body 20 in a state as shown in FIG. 4B is rotated in B direction, the slider 26 moves together with the slide rail 24, and another end surface of the slider 26 abuts against the end surface 361 of the locking portion 36. See FIG. 4C. As a result, the slider 26 is stopped. At the same time, the slider 26 is relatively moved in A direction within the slide rail 24. When the one end surface of the slider 26 abuts against the end wall 244 of the slide rail 24, the rotation of the rotation body 20 is inhibited. In other words, the rotation body 20 is held with a locking portion 36 via the slider 26.

Next, the rotatable angle of the rotation body 20 will be described. The rotatable angle θ (degree) can be defined as a rotation angle from the state as shown in FIG. 4A and FIG. 5A to the state as shown in FIG. 5A and FIG. 5B. Referring to FIGS. 5A and 5B, the peripheral length of the groove 25 of the slide rail 24 is designated as "L1", the peripheral length of the slider 26 is designated as "T1", and the radius of the groove 25 and the slider 26 is designated as "R". The rotatable angle θ (degree) meets the following relationship:

$$\theta = 360 \cdot (L1 - 2 \cdot T1)/(R \cdot 2 \cdot \pi)) + 360$$

The width of the locking portion 36 is considered to be small, and thus ignored.

The function and effect of this embodiment of the rotation range-limiting device will be described. The rotation range-limiting device 10 has the disc-shaped rotation body 20 provided with the carrying surface 211 on which the camera 11 can be disposed, and the stationary body 30 supporting the rotation body 20 such that the rotation body 20 can rotate about the center point of the rotation body 20. The rotation body 20 is provided with the slide rail 24 on the surface (i.e., the opposite surface) 212 which is opposite to the carrying surface 211. The slide rail 24 is arc-shaped. The center of the arc-shaped slide rail 24 corresponds to the center point of the rotation body 20. The slide rail 24 is provided with end walls 243 and 244 at its both ends, respectively. Furthermore, the slide rail 24 is provided with the slider 26 which is movable along the inner portion of the slide rail 24. Therefore, the slider 26 is disposed such that it is movable between the both end walls 243 and 244 of the slide rail 24. The stationary body 30 is provided with the locking portion 36 on the lower surface 301 opposed to the opposite surface 212 of the rotation body 20. The locking portion 36 is formed on a circle having the same diameter as the slide rail 24, and projects toward the slide rail 24. In other words, the locking portion 36 and the slide rail 24 are formed at the same imaginary circle. The locking portion 36 is formed such it can abut against the slider 26 which is movable along the slide rail 24.

With the above configuration, when the rotation body 20 is relatively rotated in one direction in relation to the stationary body 30, the locking portion 36 of the stationary body 30 abuts against the slider 26. In this situation, the slider 26 is moved along the slide rail 24. In addition, when the slider 26 abuts against the one end wall 243 of the slide rail 24 and is stopped, the rotation of the rotation body 20 is inhibited. Furthermore, when the rotation body 20 is relatively rotated in another direction in relation to the stationary body 30, the locking portion 36 of the stationary body 30 abuts against the slider 26. In this situation, the slider 26 is moved along the slide rail 24. In addition, when the slider 26 abuts against another end wall 244 of the slide rail 24 and is stopped, the rotation of the rotation body 20 is inhibited.

By virtue of the afore-mentioned mechanism the rotation body 20 which can be rotated relative to the stationary body 30 is only rotated within a predetermined range of from 360 degrees to 720 degrees. Accordingly, the rotation range of the rotation body 20 can be effectively controlled while decreasing number of the parts to be needed as well as downsizing of overall apparatus. The rotation range-limiting device 10 can be relatively easily manufactured by disposing the slider 26 on the slide rail 24, and coupling the rotation body 20 to the stationary body 30.

In accordance with the rotation range-limiting device 10, as peripheral length T1 of the slider 26 is shorter or less than the peripheral length L1 of the slide rail 24, the slider 26 is made movable within the slide rail 24. In terms of height, the slider 26 is made such that it abuts against the locking portion 36 of the stationary body 30 but does not contact portions other than the locking portion 36. Accordingly, the movement of the slider 26 is limited only when the slider 26 abuts against the locking portion 36 of the stationary body 30, and when the slider 26 abuts against the end wall 243, 244.

In the rotation range-limiting device 10, the rotatable angle θ (degree) of the rotation body 20 can be defined as follows. Provided that the peripheral length of the slide rail 24 is designated as "L1", the peripheral length of the slider 26 is designated as "T1", and the radius of the slider 26 is designated as "R", $$\theta = 360 \cdot (L1 - 2 \cdot T1)/(R \cdot 2 \cdot \pi)) + 360$$

For the above reasons, the relative rotatable angle of the rotation body 20 relative to the stationary body 30 can be mechanically limited to the predetermined range of from 360 degrees (2π) to 720 degrees (4π). Furthermore, the rotatable angle θ can be increased by either increasing the peripheral length L1 of the slide rail 24 or decreasing the peripheral length T1 of the slider 26.

As camera apparatus 1 of this embodiment has the rotation range-limiting device 10, an image can be captured or obtained in any orientation or direction within the predetermined range of from 360 degrees (2π) to 720 degrees (4π). The rotation range-limiting device 10 can be provided with the motor 40 configured to rotation drive the rotation body 20. Accordingly, by controlling the rotation angle of the motor 40, the rotation angle of the rotation body 20 in panning direction can be controlled, thereby allowing the camera apparatus 1 to orient in a predetermined or desired direction and take an image.

The camera apparatus 1 can be further provided with a tilting mechanism (i.e., a tilting device) configured to rotate the camera 11 in a tilting direction. By adopting the above configuration, the camera apparatus 1 can be oriented in a desired direction with respect to tilting direction (i.e., rotation in a vertical plane) as well as panning direction (i.e., rotation in a horizontal plane), and imaged.

In the first embodiment of the invention, the camera apparatus 1 is provided with the camera (device) 11 coupled to the lower portion (lower side) of the rotation range-limiting device 10. However, the camera 11 may be coupled to the upper portion (upper side) of the rotation range-limiting device 10. In this configuration, the rotation range-limiting device 10 can be disposed such that the rotation body 20 is disposed over the stationary body 30, and the camera 11 is mounted on the carrying surface 211 which corresponds to the upper surface of the rotation body 20. In this configuration, the slide rail 24 and the slider 26 may be disposed in the stationary body 30, and the locking portion 36 can be disposed in the rotation body 20.

In accordance with the first embodiment of the invention, in order to reduce loads resulting from rotation the rotation body 20 is rotated via the intermediate gear 43 and the pinion gear 44 by the motor 40. However, the intermediate gear 43 and the pinion gear 44 may be omitted. In this case, the panning gear 221 of the rotation body 20 may be directly rotated by the driving gear 42 of the rotation shaft 41. Furthermore, the motor 40 may be also omitted. In this case, the rotation body 20 may be manually rotated.

Figure 6A:
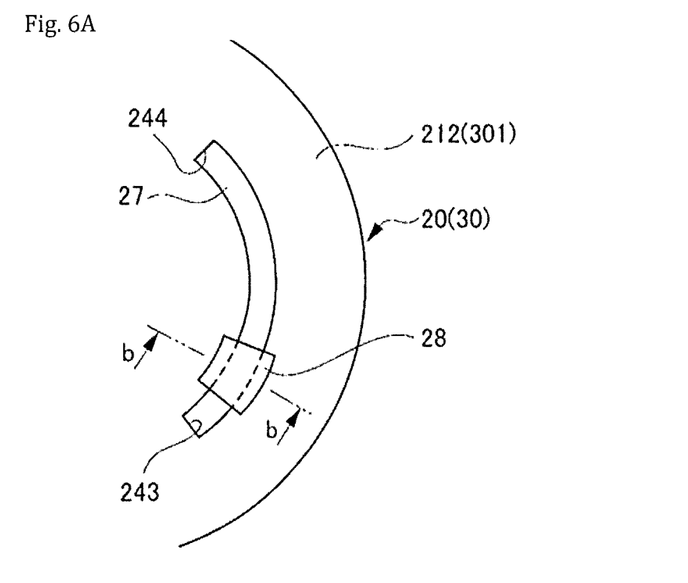
FIG. 6A is a plan view of a modified version of the first embodiment in which slide-guiding portion is modified.

In accordance with the first embodiment of the invention, the slide-guiding portion includes the slide rail 24 and the slider 26. The slide rail 24 has the inner wall 241 and the outer wall 242 spaced at an interval from each other, and the arc-like groove 25 disposed between the inner wall 241 and the outer wall 242. The slider 26 can slide on (along) the groove 25. Alternatively, as shown in FIG. 6A, an arc-shaped opening 27 may formed as the slide-guiding portion, and a slider 28 may be movable along the opening 27. In this configuration, the end walls 243 and 244 are formed in the both circumferential ends of the opening 27 respectively. The end walls 243 and 244 may correspond to both longitudinal end surfaces of the opening 27 respectively.

Figure 6B:
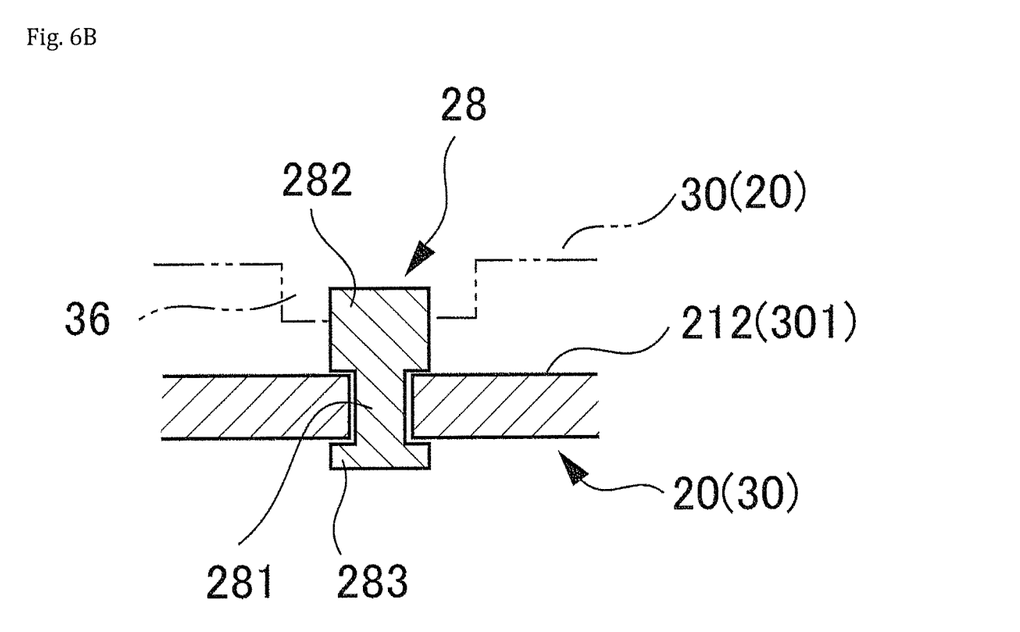
FIG. 6B is a cross-section of the modified version of the first embodiment along the line b-b of FIG. 6A.

Referring to FIG. 6B, the slider 28 is provided with an arc-shaped thin wall 281, which has a width less than width of the opening 27 in the middle of the height, and has a height greater than the thickness of the rotation body 20. The thin wall 281 is connected to an upper support 282 at the upper end thereof and a lower support 283 at the lower end thereof. The upper support 282 and the lower support 283 have a width greater than the width of the opening 27. The above configuration stops the slider 28 from slipping or dropping from the opening 27. The upper support 282 is disposed at the stationary body 30 side (in the vicinity of the stationary body 30), and is high enough to interfere with the locking portion 36 of the stationary body 30.

Accordingly, regardless of the arrangement (in particular, vertical arrangement) of the stationary body 30 and the rotation body 20, the slider 28 is prevented from slipping or dropping from the opening 27. Furthermore, when the slider 28 is intended to be mounted to the opening 27, the upper support 282 and the lower support 283 are prepared independently of the thin wall 281. After the thin wall 281 is inserted into the opening 27, the upper support 282 and the lower support 283 are integrated such that they sandwich the rotation body 20 therebetween. While one modified version of the first embodiment in which the opening 27 is formed in the rotation body 20 is discussed in above paragraphs, the opening 27 and the slider 28 may be disposed in the stationary body 30 and the locking portion 36 may be disposed in the rotation body 20. Another modified version of the first embodiment is also shown in FIGS. 6A and 6B. See reference numeral in parentheses in FIGS. 6A and 6B.

Second Embodiment

Figure 7:
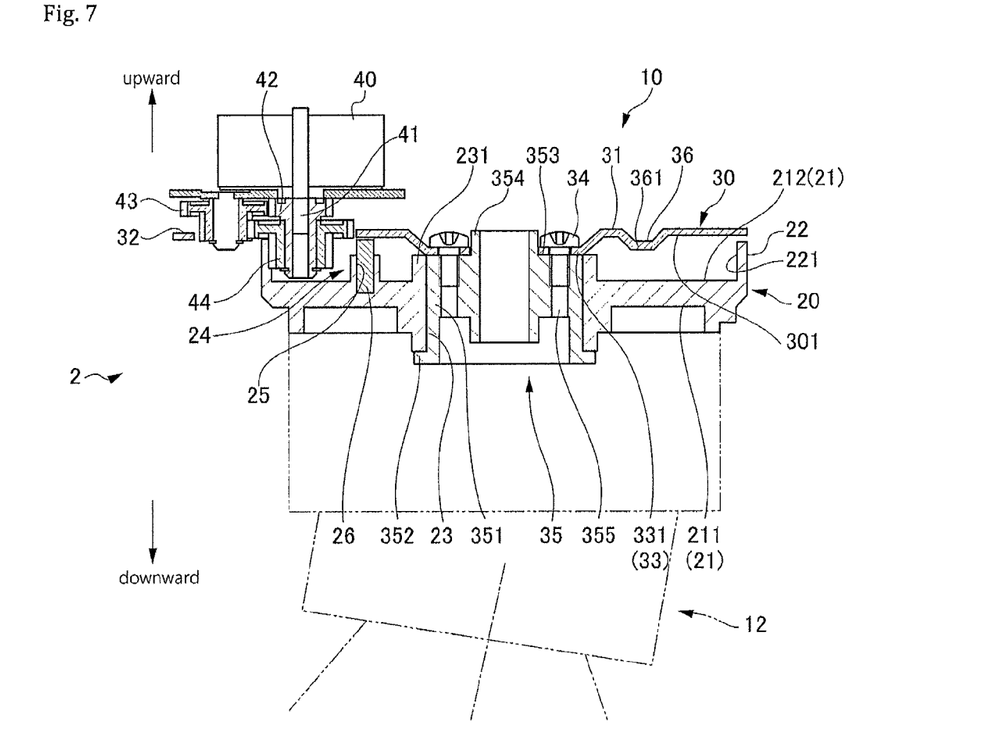
FIG. 7 is a sectional view of a second embodiment of the inventive lighting apparatus.

A lighting apparatus in accordance with the second embodiment of the invention will hereinafter be described with reference to FIG. 7. Referring to FIG. 7, the lighting apparatus 2 has a lighting device (a device or an object to be rotated) 12 which is mounted on the carrying surface 211 of the rotation range-limiting device 10. The lighting device 12 which can be employed in this embodiment may deliver or orient illuminated light in a desired direction. The lighting device 12 may be a spotlight. The same reference numeral(s) is imparted to the same part(s) or portion(s) as is employed in the first embodiment, and the detailed description is omitted to avoid unnecessary duplication.

The function and effect of the lighting apparatus 2 in accordance with the second embodiment is described. As the lighting apparatus 2 has the afore-mentioned rotation range-limiting device 10, excessive rotation is prevented and the rotation is limited to a predetermined range of from 360 degrees (2π) to 720 degrees (4π). At this time, it can be oriented in any direction.

The rotation range-limiting device 10 can be provided with the motor 40 configured to rotation drive the rotation body 20 in a panning direction (in a horizontal plane). Accordingly, by controlling the rotation angle of the motor 40, the rotation angle of the rotation body 20 can be controlled, thereby allowing the lighting apparatus 2 to deliver light in a predetermined or desired direction. The lighting apparatus 2 can be provided with a tilting mechanism (i.e., a tilting device) configured to rotate the lighting device 12 in a tilting direction (in a vertical plane). By adopting the above configuration, the lighting apparatus 2

(in particular, the lighting device 12) can be oriented in a desired direction with respect to tilting direction as well as panning direction.

Furthermore, the aforementioned embodiments are only shown some representatives of this invention, and this invention is not limited of these embodiments. Therefore, it can be performed with several changes without deviating from the scope of this invention. For example, in the aforementioned embodiments, the rotation body 20 and the stationary body 30 are disposed in a horizontal manner. However, the rotation body 20 and the stationary body 30 may be disposed in a vertical manner, or disposed on an inclined wall and etc. Furthermore, the rotation range-limiting device in accordance with the invention can be also applied to an apparatus equipped with a device such as a monitor, a speaker, and etc., or a directional, antenna-rotating apparatus.

LIST OF REFERENCE NUMERAL 1 camera apparatus
2 lighting apparatus
10 rotation range-limiting device
11 camera (device or object to be rotated)
12 lighting device (device or object to be rotated)
20 rotation body
211 carrying surface
212 opposite surface (one of the opposed surfaces)
23 center hole (center point)
24 slide rail (slide-guiding portion)
243, 244 end wall
26 slider
30 stationary body
301 lower surface (another of the opposed surfaces)
36 locking portion
L1 peripheral length of the slide rail
R radius of slide-guiding portion (or radius of slider)
T1 peripheral length of slider
θ rotatable angle

The invention claimed is:

1. A rotation range-limiting device, comprising:
   a rotation body to which an object to be rotated is mounted;
   a stationary body rotatably supporting the rotation body;
   a slide-guiding portion as an arc-shaped groove disposed on either one of the rotation body and the stationary body, and having end walls formed at both ends thereof;
   a locking portion disposed on another of the rotation body and the stationary body;
   a slider movable along the slide-guiding portion, wherein when the slider abuts against the locking portion and either one of the end walls of the slide-guiding portion, the slider is stopped from rotation, and wherein as the rotation body rotates, the slider rotates together with the slide-guiding portion or the locking portion and abuts against both of the locking portion and either one of the end walls of the slide-guiding portion to stop a rotation of the rotation body;
   a motor disposed in the stationary body;
   a gear coupled to the motor; and
   a panning gear intermeshing the gear and formed in a peripheral wall of the rotation body.

2. The rotation range-limiting device according to claim 1, wherein the rotation body has a center point corresponding to a center of the slide-guiding portion.

3. The rotation range-limiting device according to claim 1, wherein the slider is arranged interiorly of the panning gear.

4. The rotation range-limiting device according to claim 1, wherein the object to be rotated is a camera.

5. The rotation range-limiting device according to claim 1, wherein the object to be rotated is a lighting device.

6. The rotation range-limiting device according to claim 1, wherein after the slider abuts against the locking portion, the slider relatively moves along the slide-guiding portion in a direction opposite to a direction where the rotation body rotates and abuts against the either one of the end walls of the slide-guiding portion to stop the rotation of the rotation body.

7. The rotation range-limiting device according to claim 1, wherein after the slider abuts against the locking portion, the slider moves along the slide-guiding portion in a direction where the rotation body rotates and abuts against the either one of the end walls of the slide-guiding portion to stop the rotation of the rotation body.

* * * * *